April 18, 1933.  C. R. OHNSORG  1,904,746
ROTARY WING AIRCRAFT PROPELLER
Filed Nov. 23, 1929
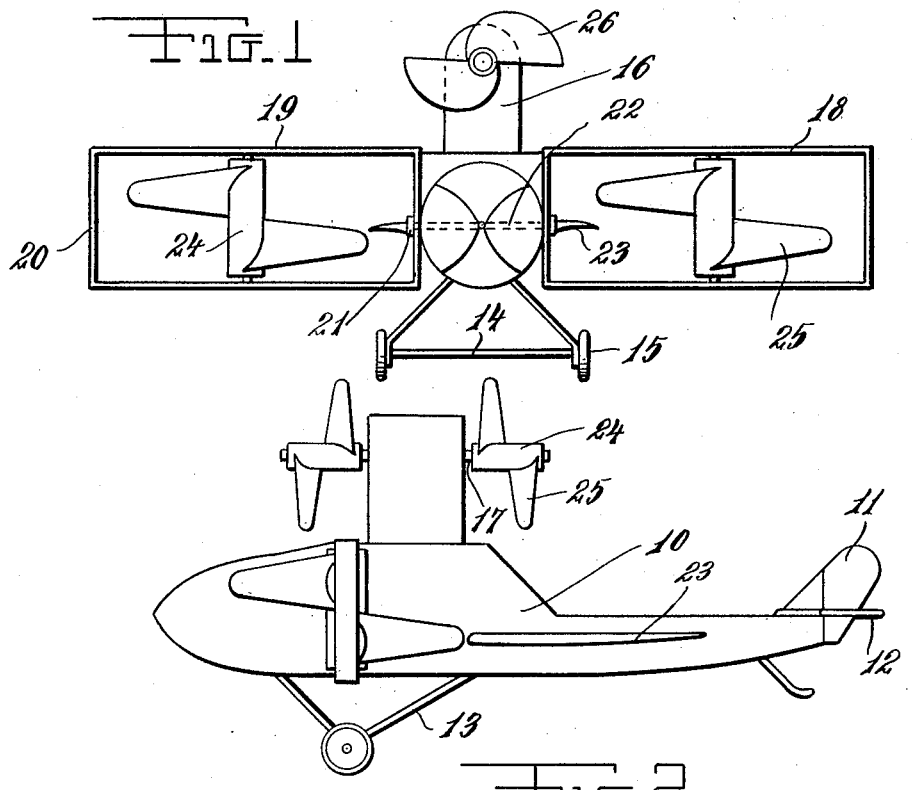
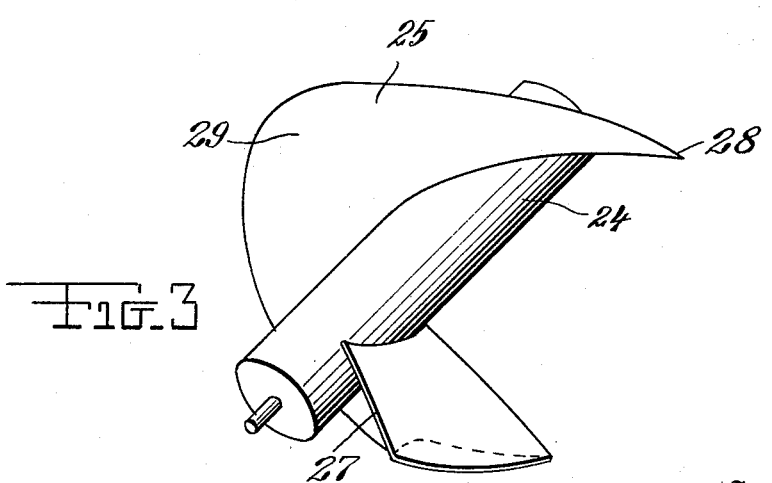
Inventor
C. R. Ohnsorg
By his Attorney F. Ledermann Patented Apr. 18, 1933

1,904,746

UNITED STATES PATENT OFFICE

CHARLES R. OHNSORG, OF NEW YORK, N. Y., ASSIGNOR OF ONE-HALF TO JOSIE OHNSORG, OF NEW YORK, N. Y.

ROTARY WING AIRCRAFT PROPELLER

Application filed November 23, 1929. Serial No. 409,214.

The main object of this invention is to provide an air craft having wings which are adapted to rotate through means of a power plant located in the fuselage of the air craft.

Another object of the invention is to provide rotary wings supported on horizontally revoluble frames which are adapted to be adjusted angularly to permit the functioning of the rotary wings so that the air craft may attain a forward, directional thrust at the same time.

The above and other objects will become apparent in the description below in which characters of reference refer to like-named parts in the drawing.

Referring briefly to the drawing, Figure 1 is a front elevational view of the air craft showing the arrangement of the lifting rotary wings and the directional rotary wing.

Figure 2 is a side elevational view of Figure 1.

Figure 3 is an enlarged perspective view of one of the rotating wings used with the air craft.

Referring in detail to the drawing, the numeral 10 indicates the fuselage of an air craft, this fuselage is perfectly stream-lined and its rear end is provided with a vertical rudder 11 and elevator rudders 12. To permit maneuvering over a terrain an undercarriage is provided which comprises struts 13 converging toward each other to which an axle 14 is attached, the axle being mounted upon wheels 15. Erected upon the top of the fuselage 10 is a motor housing 16 in which the power plant actuating the rotary wings, hereinafter mentioned, and the directional propeller is located. The power plant in the housing 16 rotates a shaft 17, having drum hubs 24a upon both ends of which a wing-like helical propeller 25a is mounted.

On the sides of the fuselage rectangular frames 18 and 19 are pivotally mounted. These frames comprise parallel longitudinal members which are joined by connecting bars 20. The connecting bar of each of the frames lying adjacent the fuselage are provided with hubs 21, to which shaft 22, or the like, is connected. This shaft is adapted to be used in conjunction with means for rotating said shaft and thereby adjusting the positions of the frames 18 and 19. Rearward of the frames sustaining surfaces or rigid planes 23 are provided to aid in retaining the equilibrium of the air craft while in flight.

Intermediate the length of parallel bars forming the horizontal members 18 and 19 of the frames drums 24 are rotatably mounted on a shaft which is journaled in the longitudinal bars of the frame. These drums are adapted to house the engines which rotate said drums. The drums have projecting radially in a helical plane blades, or wings as indicated by the numeral 25. The helical wings 25 are provided with an enlarged straight entering edge 27 from which the width of the wing gradually increases, the maximum width being attained at a point 29 intermediate the length of the wing, from which maximum width the wing gradually tapers to a point 28 offset at a distance from the surface of the drum 24.

The air craft illustrated in the accompanying drawing introduces a novel type of flying machine, which is equipped with rotatable sustaining surfaces used in conjunction with auxiliary, rigid retaining surfaces. The propellers 26 mounted on the shaft 17 of the power plant in the housing 16 is adapted to give the air craft horizontal, directional flight.

To attain elevation in a vertical plane the frames 18 and 19 are adjusted to a position shown in Figure 2, and the rotating wings 25 are set in motion. To retain the desired altitude these rotating wings 25 must constantly be kept in rotation and when forward elevational and directional flight is desired these frames 18 and 19 are adjusted to a forwardly, inclined position so that the axes of the drums 24 will also assume a forwardly, inclined position.

It is to be noted that certain changes in form and construction may be made without departing from the spirit and scope of the invention.

I claim:

In an aircraft, means for propelling the same comprising a cylindrical drum adapted to be rotated, a helical annular wing mounted on the surface of the drum, said wing extending around said surface, the front edge of said wing being substantially straight and extending a distance from the drum, the width of said wing being increasingly greater rearward of said edge and attaining its maximum width at a point intermediate said edge and the opposite end of the wing, said wing tapering to a point from the point of maximum width, said tapered point lying beyond the surface of the drum, the edge of said wing lying nearest said drum contacting with said surface the greater part of its length and departing from said surface at a point intermediate the length of the drum and continuing convergently therefrom to said tapered point.

In testimony whereof I affix my signature.

CHARLES R. OHNSORG.